US008781515B2

(12) United States Patent
Agulnik et al.

(10) Patent No.: US 8,781,515 B2
(45) Date of Patent: Jul. 15, 2014

(54) METHOD AND APPARATUS FOR PROVIDING A GROUP COMMUNICATIONS FOLLOW MODE

(75) Inventors: Anatoly Agulnik, Deerfield, IL (US); Tyrone D. Bekiares, Chicago, IL (US); Donald G. Newberg, Hoffman Estates, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 290 days.

(21) Appl. No.: 13/223,561

(22) Filed: Sep. 1, 2011

(65) Prior Publication Data

US 2013/0059622 A1 Mar. 7, 2013

(51) Int. Cl.
*H04B 7/00* (2006.01)
*H04W 4/08* (2009.01)
*H04W 4/10* (2009.01)
*H04W 76/00* (2009.01)

(52) U.S. Cl.
CPC . *H04W 4/08* (2013.01); *H04W 4/10* (2013.01); *H04W 76/005* (2013.01)
USPC .......................... 455/518; 455/519; 455/520

(58) Field of Classification Search
USPC ......... 455/517–520, 553.1, 90.2, 78, 79, 500, 455/426.1, 412.1, 414.1, 416, 420; 370/352, 389, 338, 328
See application file for complete search history.

(56) References Cited

U.S. PATENT DOCUMENTS

| | | | |
|---|---|---|---|
| 6,477,387 B1 | 11/2002 | Jackson et al. | |
| 6,600,928 B1 * | 7/2003 | Ahya et al. | 455/518 |
| 7,031,304 B1 | 4/2006 | Arberg et al. | |
| 7,751,806 B1 * | 7/2010 | Vu | 455/418 |
| 2002/0173311 A1 * | 11/2002 | Biggs et al. | 455/450 |
| 2005/0075121 A1 * | 4/2005 | Hasegawa | 455/518 |
| 2005/0289236 A1 | 12/2005 | Hull et al. | |
| 2006/0223518 A1 | 10/2006 | Haney | |
| 2007/0225024 A1 * | 9/2007 | Li | 455/518 |
| 2007/0274460 A1 * | 11/2007 | Shaffer et al. | 379/37 |
| 2009/0177977 A1 | 7/2009 | Jones et al. | |
| 2010/0014497 A1 * | 1/2010 | Aggarwal et al. | 370/338 |
| 2010/0177661 A1 | 7/2010 | Dailey | |
| 2010/0195642 A1 * | 8/2010 | Terpstra et al. | 370/352 |
| 2010/0311459 A1 * | 12/2010 | Holland | 455/518 |
| 2011/0092172 A1 | 4/2011 | Stille et al. | |
| 2011/0319117 A1 * | 12/2011 | Gonsalves et al. | 455/519 |

OTHER PUBLICATIONS

PCT International Search Report Dated Dec. 19, 2012 for Counterpart Application PCT/US2012/051324.

* cited by examiner

*Primary Examiner* — Dominic E Rego
(74) *Attorney, Agent, or Firm* — Steven A. May

(57) ABSTRACT

A method and apparatus for enabling a group communications follow mode at a first group communications (GC) user equipment (UE) device. A GC server receives a request from a first client UE device to follow a second Client UE device, and responsively: affiliates the first client UE device with a same one or more talk groups with which the second client UE device is currently affiliated, monitors for talk group affiliation and disaffiliation requests from the second client UE device and automatically affiliates or disaffiliates both the first client UE device and the second client UE device from a first particular talk group in accordance with a corresponding affiliation or disaffiliation instruction received from the second client UE device.

24 Claims, 5 Drawing Sheets

METHOD AND APPARATUS FOR PROVIDING A GROUP COMMUNICATIONS FOLLOW MODE

FIELD OF THE DISCLOSURE

The present disclosure relates generally to group-based messaging and more particularly to a method and apparatus for providing a group communications follow mode, allowing a following user equipment device to follow a followed user equipment device and duplicate a group talk experience of the followed user equipment, including changes to group membership and/or scan lists made by the followed user equipment device.

BACKGROUND

The present disclosure pertains to communication systems and more particularly to communication systems supporting group calls. Group calls are similar to conference calls in which a number of subscribers are interconnected for the purpose of common conversation. Group calls may be performed between both wireless and wireline users.

In the past, group calls were initiated by an originating user calling and establishing connection with a first participating user, then another participating user, etc. The originating user controlled the selection and implemented the connection to each of the participating users. This is very often a time consuming process. Further, the originating user had to have the capability to initiate conference calls via the originating user's local network.

More recent advances in technology have provided networks with more advanced features for supporting group call functions. These arrangements typically involve push-to-talk (PTT) services. The group call interconnections may be made between wireless and/or wireline participants via the internet, for example, or may exist between devices in a narrow-band trunked radio architecture. Typically, members of groups for group calls are statically defined. That is, a user, or administrator working on behalf of the user, indicates to the switching and/or or radio network a list of participants of a talk group at the time of the call or in advance of the call. The group members could be provisioned in the network by the user or an agent, and then provided some form of group identity, for example, to make the call. Then, at a future time, an originating user may perform some signaling to indicate that he wishes to establish a communication session (e.g., group call) with each of the pre-designated participants in the defined talk group. An originating user, or an agent thereof, may modify the originating user's group membership at any time, perhaps affiliating the originating user with new talk groups, or disaffiliating the originating user with other previously associated talk groups.

Once a radio affiliates with a particular group, it will receive all communications sent by other members of that group. An entity within a radio communications network that has affiliation information can use then affiliation information to properly distribute communications from one affiliated radio to all other affiliated radios in a particular group. Radios may affiliate with one or more groups at a time, and may change their affiliation over time, affiliating with new groups and disaffiliating with prior groups.

In one example, an originating user may be a Police Chief and may be a member of a "Police-Supervisors" group and an "Emergency Responders" group, and may receive, or be configured to receive, audio from group members in those two groups. The "Emergency Responders" group may be set at a higher priority than the "Police-Supervisors" group, such that the originating user's radio is provided with the higher priority group audio (e.g., "Emergency Responders") in place of the "Police-Supervisors" group whenever audio is available or detected in the "Emergency Responders" group. For example, a switch, group communications/PTT server, or other device in a service provider network may arbitrate the channels and provide the originating user's radio with the highest priority audio. In other embodiments, the originating user's radio may be configured to scan radio channels associated with the higher priority group more often, or to switch to a channel associated with the higher priority group when communications in the higher priority group are detected on a different channel.

As new groups are added or re-defined in the communications system, the originating user may be removed from one or more of the groups, and may be associated with one or more new groups. For example, the originating user may be removed from the "Emergency Responders" group and added to the "Highway Patrol Emergency Responders" group.

In the aforementioned communications system, there may be circumstances where a second originating user wishes to be affiliated with, and able to monitor and/or communicate with, a same set of groups as the first originating user.

For example, a trainee or second-in-command may wish to follow the Police Chief's radio and duplicate the media streams that the police chief's radio receives. Presently, this action requires the second originating user (e.g., the trainee or second-in-command in the example above) to manually duplicate the group membership requests of the first originating user, and/or the second originating user to configure his or her radio to monitor the same group channel(s) as the first originating user using the same prioritization algorithm as the first user. Even in this instance, allowing the second originating user to duplicate the first originating user's group memberships may raise security concerns. Finally, there is no current solution for tracking group membership over wide area and geographically disperse networks.

Accordingly, there is a need for an improved method and apparatus for providing a group communications follow mode that allows a second originating user to follow a first originating user, and provides additional security mechanisms throughout the process.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
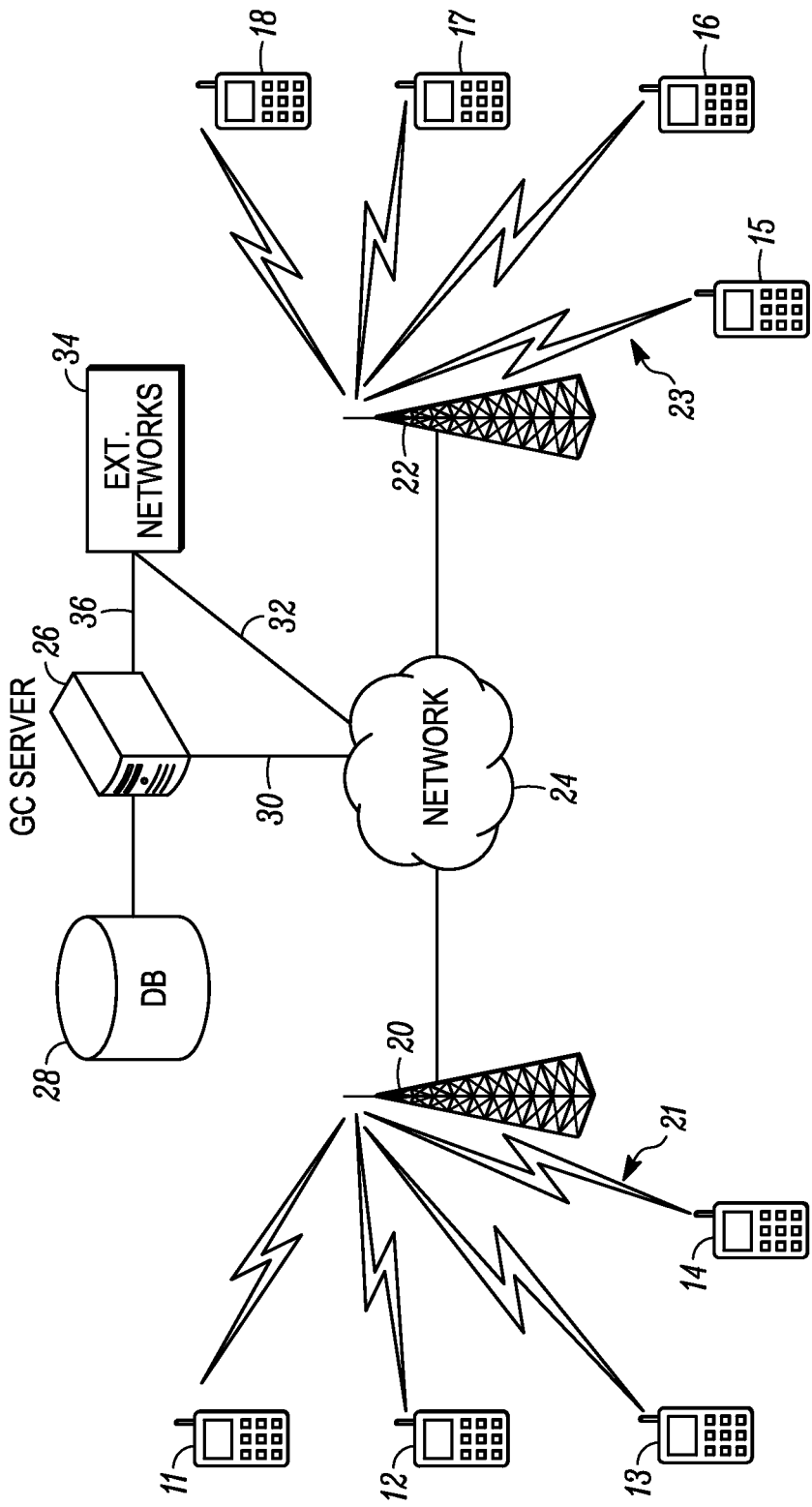
FIG. 1 is a block diagram of a communications network in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Disclosed is a method and apparatus for enabling a group communications follow mode at a first group communications (GC) user equipment (UE) device. A GC server receives a request from a first client UE device to follow a second client UE device, and responsively: affiliates the first client UE device with a same one or more talk groups with which the second client UE device is currently affiliated, monitors for talk group affiliation and disaffiliation requests from the second client UE device and automatically affiliates or disaffiliates both the first client UE device and the second client UE device from a first particular talk group in accordance with a corresponding affiliation or disaffiliation instruction received from the second client UE device. As a result, a first client UE device can duplicate a group talk experience of a second UE device, including changes to group membership made by the second UE device and even through the second client UE device's changing group scan list.

1. Network Architecture and Device Structure

FIG. 1 illustrates a communications network 10 including client group communications devices (e.g., UEs) 11-18, central communication stations 20, 22 (e.g. base stations), wireless links 21, 23, backhaul network 24, GC server 26, database 28, communications connections 30, 32, 36, and external networks 34. Each base station 20, 22 has at least one radio transmitter covering a radio coverage cell (not shown). One or several UEs 11-18 within radio coverage of the base stations may connect to the base stations using a wireless communication protocol via wireless links 21, 23. The UEs 11-18 may communicate with each other, and perhaps other devices accessible via other network links, using a group communications protocol over wireless links 20, 22. Wireless links 21, 23 may be, for example, a wireless link supporting a protocol such as GPRS or UMTS, 2G, (e.g. GSM), 3G (e.g. WCDMA or LTE), iDEN, wireless LAN (WLAN), and ETSI Digital Mobile Radio (DMR). The UEs 11-18 may be configured with an identification reference (such as an IMSI, International Mobile Subscriber Identity) which may be connected to a physical media (such as a SIM card, Subscriber Identity Module).

Each UE may be a group communications device, such as a push-to-talk (PTT) device, that is normally maintained in a monitor only mode, and which switches to a transmit-only mode (half-duplex) or transmit and receive mode (full-duplex) upon depression or activation of a PTT input switch. The group communications architecture in communications network 10 allows a single UE, such as UE 11, to communicate with one or more members (such as UEs 12-18) associated with a particular group of UEs at the same time. UEs, base stations 20, 22, and/or GC server 26 may cooperate to define groups of UEs and enable the one-to-many communications feature provided by communications network 10.

Although only eight UEs and two base stations are illustrated in FIG. 1, present disclosure is not limited as such, and more or fewer UEs and more or fewer base stations could be used in any particular implementation. Furthermore, while a single GC server 26 is illustrated in FIG. 1, more than one GC server 26 may be used and/or a distributed GC server 26 may be used that divides functions across multiple devices, perhaps for load balancing reasons. Finally, while database 28 is illustrated as directly coupled to GC server 26, database 28 may also be remote from GC server 26 and accessible to GC server 26 via one or more of network 24 and external networks 34.

The base stations 20, 22 may be linked to the GC server 26 via network 24 and communications connection 30. Network 24 may comprise one or more base stations, routers, switches, LANs, WLANs, WANs, access points, or other network infrastructure. For example, GC server 26 may be accessible via a dedicated wireline or via the Internet. In one example, base stations 20, 22 may be directly coupled to GC server 26 via one or more internal links under control of a single communications network provider.

GC server 26 may be a separate device configured to establish and/or provide group communications connections and services to UEs 11-18. In other embodiments, GC server 26 may be embodied within or coupled to another network device, such as a base station controller (BSC), mobile switching center (MSC), site controller, zone controller, Push-To-Talk controller, or other network device. Database 28 may function to store mappings between UEs 11-18 and talk groups with which they are affiliated. The term talk group is used in this specification to refer to a group of UE's. The term is not intended to be limited to voice communications, but rather, to embody all possible group communications payloads, including but not limited to, voice, data, video, audio, audio/video, images, and any other type of media stream. In addition to talk groups, database 28 may also include mappings that map a following UE to a followed UE for purposes of duplicating the followed UE's group membership configuration to the following UE's group membership configuration. Furthermore, while the terms "group call" and "talkgroup" are used throughout the specification to refer to audio group call examples in a one-to-many group communication structure, in each example, the same or similar considerations can be applied to "group sessions" and "sessiongroups," respectively, when exchanging multimedia messages between group members. Such multimedia messages may include, but not be limited to, video, audio, audio/video, images, and any other type of media stream. Furthermore, the one-to-many group communication structure may utilize any one or more messaging protocols, including unicast, multicast, broadcast, or any combination thereof.

External networks 34 may also be accessible to base stations 20, 22 (and thus UEs 11-18) via network 24 and communications connection 32 and/or GC server 26 and communications connections 30, 36. External networks 34 may include, for example, a public switched telephone network (PSTN), the Internet, or another wireless service provider's network, among other possibilities.

Communications system 10 may implement, for example, a narrow-band trunked radio communication system in which UEs 11-18 transmit control and data messages in accordance with an air interface protocol such as that defined by the ETSI Digital Mobile Radio (DMR) or APCO25 standards. In a trunked radio communication system, frequencies are assigned for talk group use on an as-needed basis, and signaling over a control channel is used to direct UEs to a particular channel to receive a particular group communication. In another embodiment, communications system 10 may implement a PTT over Cellular (PoC) or PTT over IP (PoIP) broadband architecture in which UEs 11-18 transmit control and data messages in accordance with a protocol such as real-time transport protocol (RTP) or session initiation protocol (SIP). Other possibilities exist as well.

Figure 2:
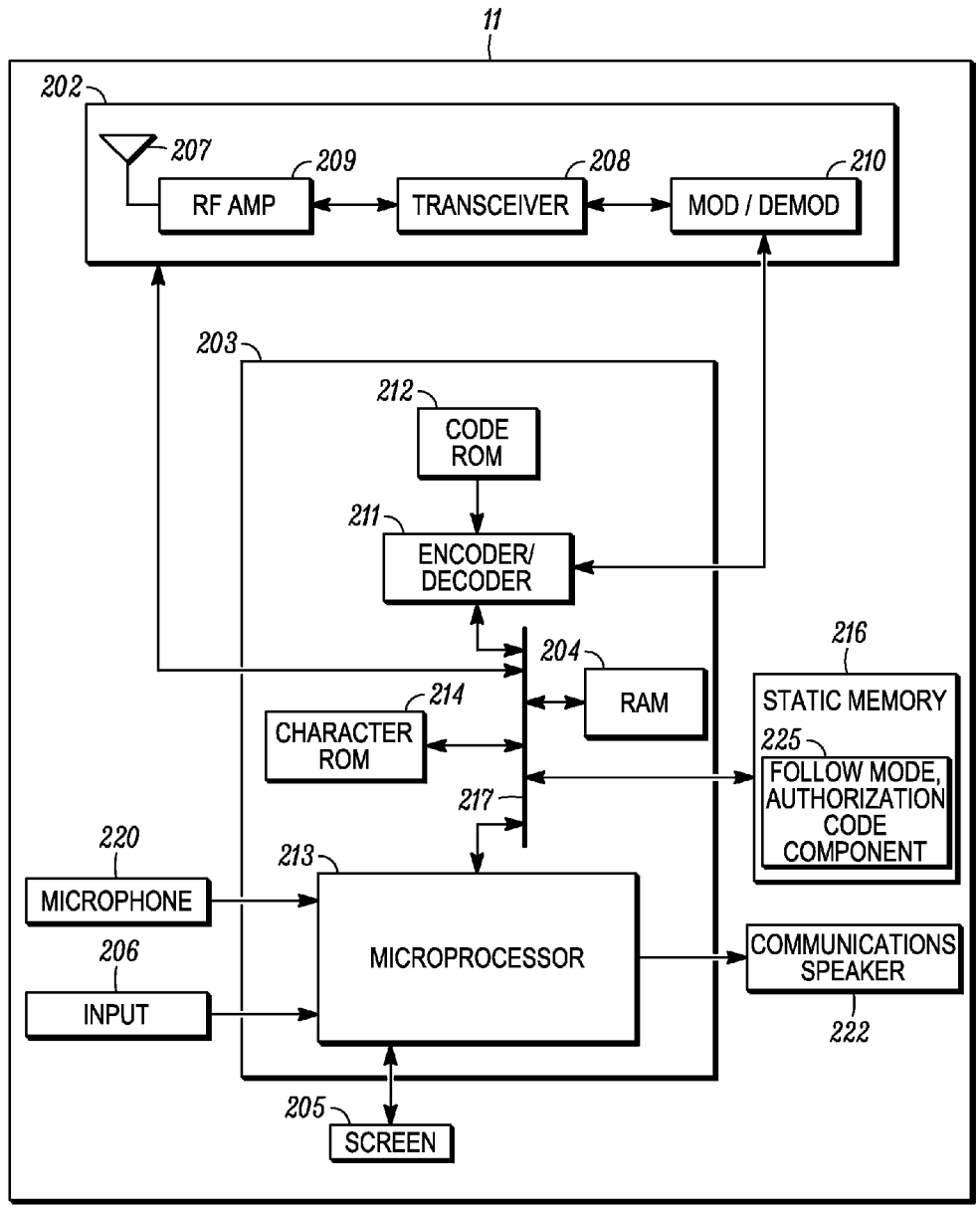
FIG. 2 is a block diagram of a client group communications user equipment device in accordance with some embodiments.

Referring to FIG. 2, a schematic diagram illustrates a UE 11 according to some embodiments of the present disclosure. It should be understood that UEs 12-18 may comprise same or similar elements to those disclosed in FIG. 2. As shown in FIG. 2, UE 11 comprises a radio frequency communications unit 202 coupled to a common data and address bus 217 of a processing unit 203. The UE 11 may also include an input 206 and a display screen 205, each coupled to be in communication with the processing unit 203. A microphone 220 captures audio from a user for encoding and transmission to other users, and a communications speaker 222 reproduces audio from encoded transmissions received from other users.

The processing unit 203 may also include an encoder/decoder 211 with an associated code Read Only Memory (ROM) 212 for storing data for encoding and decoding voice or other signals that may be transmitted or received by the UE 11. The processing unit 203 may further include a microprocessor 213 coupled, by the common data and address bus 217, to the encoder/decoder 211, a character ROM 214, a Random Access Memory (RAM) 204, and a static memory 216.

The radio frequency communications unit 202 is a combined receiver and transmitter (e.g., transceiver) having a common antenna 207. The radio frequency communications unit 202 has a transceiver 208 coupled to the antenna 207 via a radio frequency amplifier 209. The transceiver 208 is also coupled to a combined modulator/demodulator 210 that is coupled to the encoder/decoder 211.

The microprocessor 213 has ports for coupling to the keypad 206 and to the display screen 205. The microprocessor 213 further has ports for coupling to the microphone 220 and to the communications speaker 222. The character ROM 214 stores code for decoding or encoding data such as control channel messages and/or data or voice messages that may be transmitted or received by the UE 11. In some embodiments of the present disclosure, the static memory 216 can store operating code for the microprocessor 213 that, when executed by the microprocessor 213, perform the UE steps disclosed herein. For example, operating code stored in the static memory 216 may, when executed by microprocessor 213, cause the UE 11 to transmit a request to follow another UE device and subsequently received media streams that substantially duplicate those media streams that the another UE receives, or cause the UE 11 to receive a request to be followed by another UE device and either authorize or deny the request, among other possibilities. Static memory 216 may comprise, for example, a hard-disk drive (HDD), an optical disk drives such as a compact disk (CD) drive or digital versatile disk (DVD) drive, a solid state drive (SSD), a tape drive, a flash memory drive, or a tape drive, to name a few.

Figure 3:
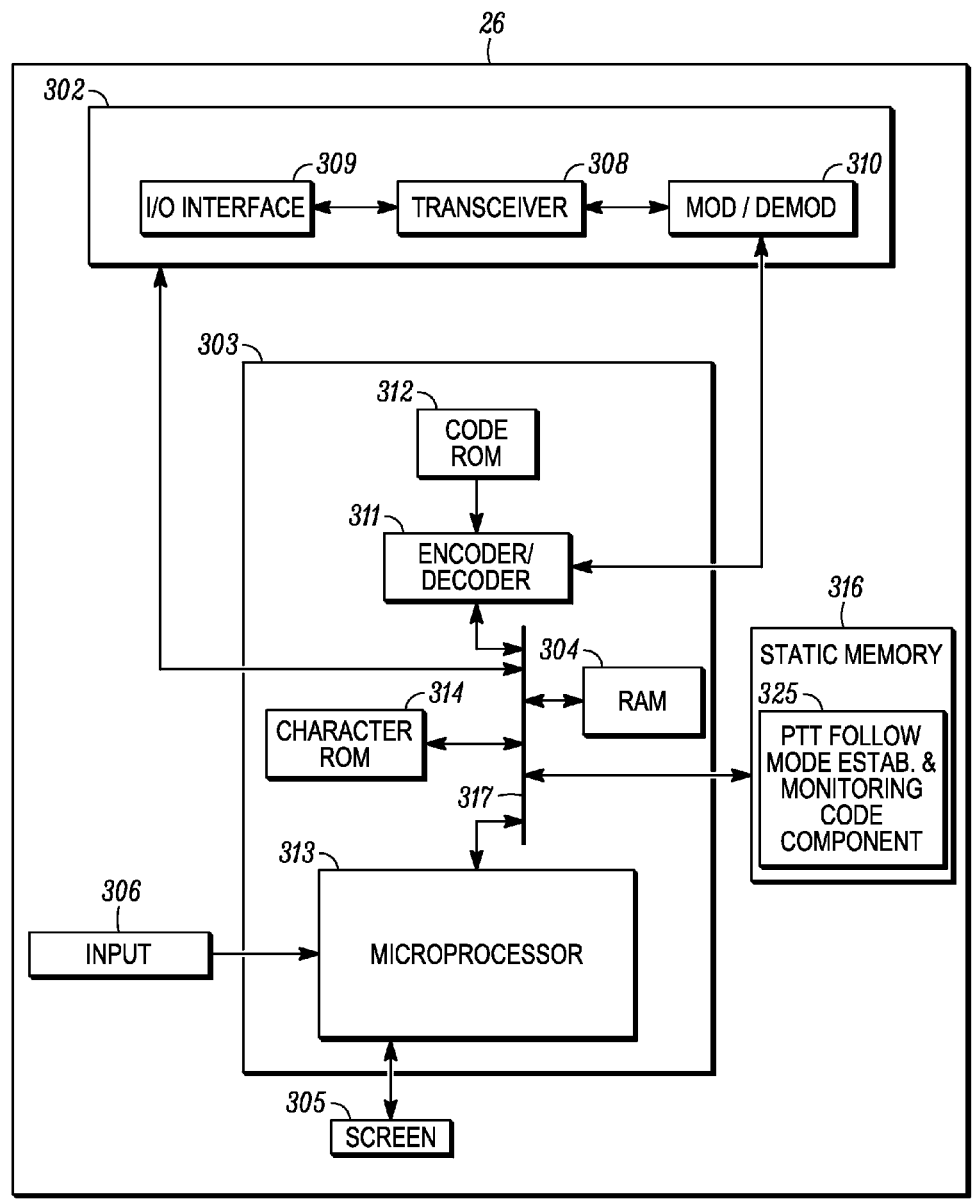
FIG. 3 is a block diagram of a group communications server in accordance with some embodiments.

Referring to FIG. 3, a schematic diagram illustrates a GC server 26 according to some embodiments of the present disclosure. As shown in FIG. 3, GC server 26 comprises a communications unit 302 coupled to a common data and address bus 317 of a processing unit 303. The GC server 26 may also include an input unit (e.g., keypad, pointing device, etc.) 306 and a display screen 305, each coupled to be in communication with the processing unit 303.

The processing unit 203 may also include an encoder/decoder 311 with an associated code Read Only Memory (ROM) 312 for storing data for encoding and decoding voice, data, control, or other signals that may be transmitted or received between UEs 11-18. The processing unit 303 may further include a microprocessor 313 coupled, by the common data and address bus 317, to the encoder/decoder 311, a character ROM 314, a Random Access Memory (RAM) 304, and a static memory 316.

The communications unit 302 may include one or more wired or wireless input/output (I/O) interfaces 309 that are configurable to communicate via a network and/or communications connections, such as the network 24 or communications connections 30, 32, 36 shown in FIG. 1. The communications unit 302 may include one or more transceivers 308, such as a Bluetooth transceiver, a Wi-Fi transceiver perhaps operating in accordance with an IEEE 802.11 standard (e.g., 802.11a, 802.11b, 802.11g), a WiMAX transceiver perhaps operating in accordance with an IEEE 802.16 standard, and/or other similar type of wireless transceiver configurable to communicate via a wireless network. The communications unit 302 may additionally or alternatively include one or more wireline transceivers 308, such as an Ethernet transceiver, a Universal Serial Bus (USB) transceiver, or similar transceiver configurable to communicate via a twisted pair wire, a coaxial cable, a fiber-optic link or a similar physical connection to a wireline network. The transceiver 308 is also coupled to a combined modulator/demodulator 310 that is coupled to the encoder/decoder 311.

The microprocessor 313 has ports for coupling to the input unit 306 and to the display screen 305. The character ROM 314 stores code for decoding or encoding data such as control channel messages and/or data or voice messages that may be transmitted or received by the GC server 26. In some embodiments of the present disclosure, the static memory 316 can store operating code for the microprocessor 313 that, when executed by the microprocessor 313, perform the GC server methods and steps disclosed herein. For example, operating code stored in the static memory 316 may, when executed by microprocessor 313, cause the GC server 26 to receive a follow mode request from a following UE, to duplicate a group messaging configuration of a followed UE indicated in the request and apply the same configuration to the following UE, and continue to monitor group messaging commands from the followed UE so as to automatically apply any future changes made to the group membership of the followed UE to the following UE, among other possibilities. In one embodiment, the operating code stored in the static memory 316 may, when executed by microprocessor 313, cause the GC server 26 to transmit a dynamic regroup command to the following UE in order to duplicate a group membership configuration of the followed UE identified in the request and provide the same configuration to the following UE in a narrowband trunked radio architecture, among other possibilities. In still another embodiment, the operating code stored in the static memory 316 may, when executed by microprocessor 313, cause the GC server 26 to authorize or deny a request from a following UE to follow a followed UE. Static memory 316 may comprise, for example, a hard-disk drive (HDD), an optical disk drives such as a compact disk (CD) drive or digital versatile disk (DVD) drive, a solid state drive (SSD), a tape drive, a flash memory drive, or a tape drive, to name a few.

GC server 26 may also have access to database 28 via one or more of the bus 317 and the communications interface 302. For example, in the former case, database 28 may be integrated with the GC server 26 and accessible via an internal bus 317. In the latter case, database 28 may be formed separate from PT server 26 and accessible via communications interface 302. Although not shown in FIG. 1, when the database 28 is formed separate from GC server 26, a separate interface may be provided at database 28 to allow a UE user or communications network operator to populate mappings maintained at the database 28.

While GC server 26 is illustrated as a separate entity from UE's 11-18 in FIGS. 1-3, in some embodiments, GC server 26 may be instantiated within one or more of the UE's 11-18 themselves. In such a case, the GC server 26 may be configured to announce its presence to other UE's via a broadcast message indicating that the source UE of the broadcast message is currently acting as the GC server 26 for the communications system 10. Database 28 may similarly be integrated within the one or more of the UE's 11-18, or may remain accessible to the particular UE in which the GC server 26 is instantiated via network 24. Other possibilities exist as well.

2. Follow Mode Communications Methods and Functions

Figure 4:
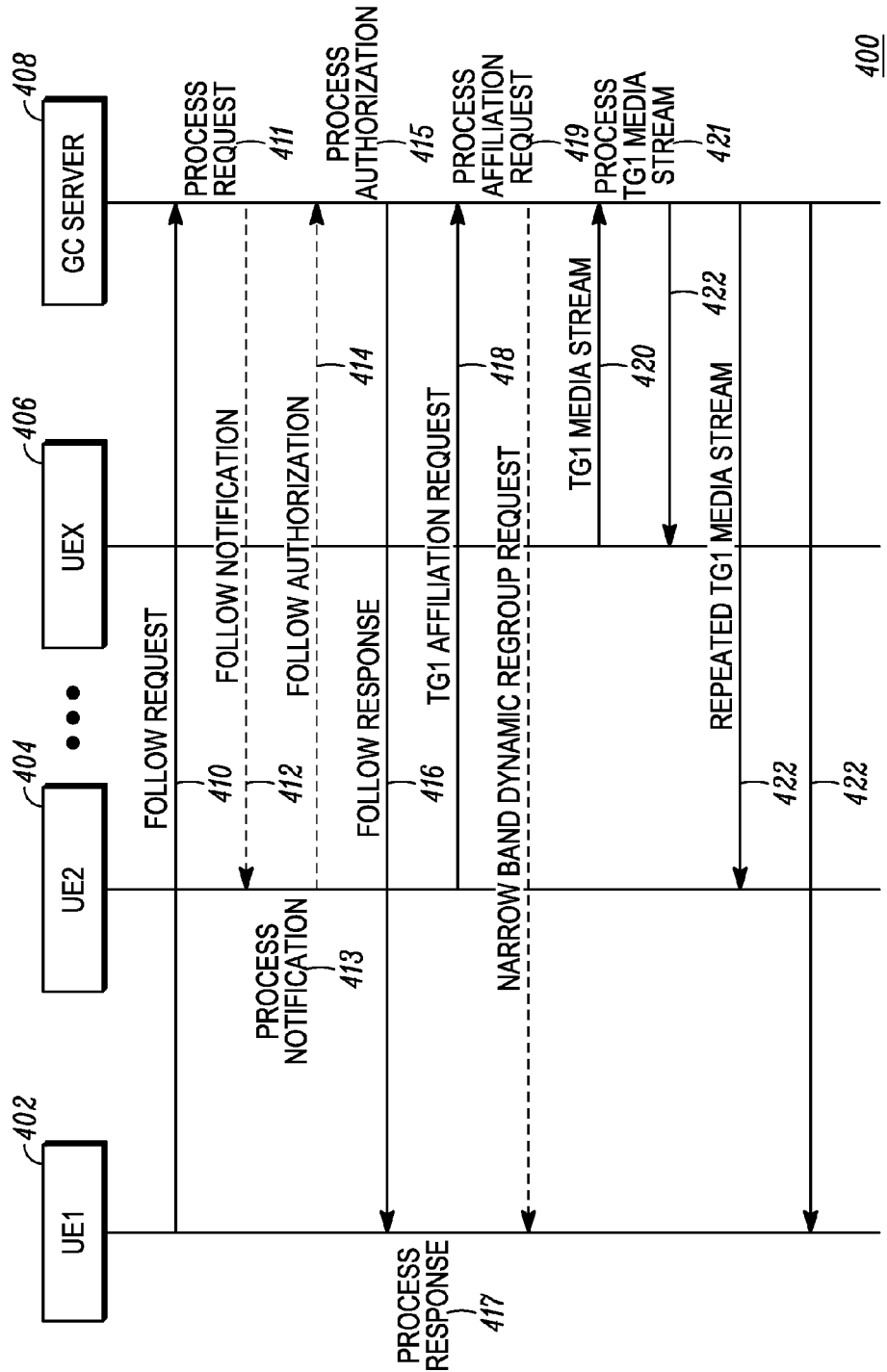
FIG. 4 is a first ladder diagram in accordance with some embodiments.
Figure 5:
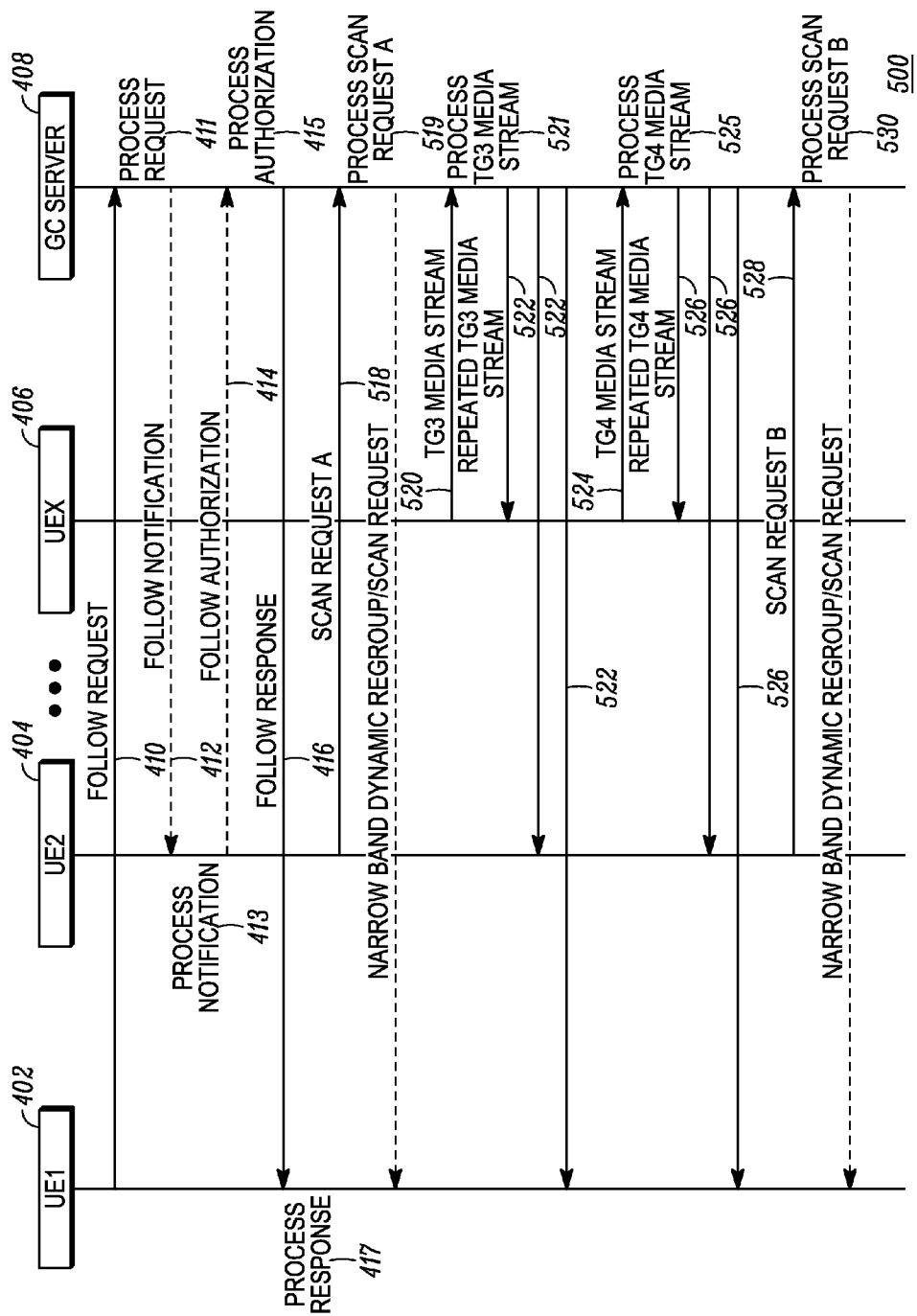
FIG. 5 is a second ladder diagram in accordance with some embodiments.

FIGS. 4-5 set forth ladder diagrams illustrating example methods for initiating, authorizing, and/or maintaining a follow mode consistent with the present disclosure. Although not illustrated in FIGS. 4-5, it is assumed that talk groups have already been created and affiliated with by a followed UE at the time of the first communication from UE1 in FIGS. 4 and 5. Talk groups could be set in advance by a user of a followed UE or perhaps by a network operator or some other entity.

While a talk group may be created in any number of ways, in one example of setting up a talk group, a user of the followed UE (hereinafter "target user") or perhaps a communications network 10 operator may pre-define affiliated member UE's with a particular group and assign the group a particular group ID (identification). The GC server 26 may store affiliation information that maps the member UE's with the particular group ID.

When the group has been created and its activation requested by the target user (or some other member of the new group), each of the identified members of the group are activated and called as in a typical group call. Each of the identified members of the group is informed that this is a group call and given the group ID by the GC server 26 and given the identity of the group call originator. Each of the identified members of the group may store the group ID provided so that, in the future, the group ID can be used to transmit a response to the group and/or to recognize future communications associated with the group. In other words, the identified members of the group may, in the future, reinitiate the group call after it has ended or may leave and rejoin an ongoing group call at will by using this group ID.

The group ID stored by each of the participants may remain valid until reallocated or invalidated by the GC server 26. Optionally, each defined group and group ID may have associated with it a feature termed "time to live" (TTL). This indicates a time when reached which the group ID will expire and no longer be valid. During the time period from origination to expiration, any number of UEs may join or leave the group, perhaps with or without permission from the target user.

In any event, FIG. 4 is a first ladder diagram in accordance with some embodiments setting forth a method 400 in which a following UE 402 (UE1) requests to follow a followed UE 404 (UE2). For example, UE 402 may be UE 11 of FIG. 1, and UE 404 may be UE 14 of FIG. 1. Additional UEs that are participants in a same one or more groups as the followed UE 404 are indicated in FIG. 4 as UEx 406 (e.g., 'x' number of additional UEs). UEx 406 is a generic designation used to identify sets of other UEs that may be transmitting media streams to, or receiving media streams from, a same group as followed UE 404, and members of the group UEx 406 may change from one step in FIG. 4 to the next. GC server 408 may be, for example, the same GC server 26 set forth in FIG. 1.

As set forth in FIG. 4, method 400 begins when UE1 402 transmits a follow request message 410 to GC server 408. The follow request 410, and subsequent messages transmitted between UE1, UE2, and GC server 408 in FIG. 4, may be transmitted to the GC server 408 in one of a control message or data message, and may comprise one or more of a SIP-protocol based message, a real-time transport protocol (RTP)-based message, a control signaling block (CSBK) message, and a packet data protocol (PDP) message, among other possibilities. In particular regard to the SIP protocol, the follow request 410 may comprise, for example, a SIP SUBSCRIBE message or a SIP PUBLISH message. One or more data fields within the follow request 410 may identify the followed UE2 by an identifier such as a username of a user currently using UE2 or a hardware identifier of the UE2 404 such as an electronic serial number (ESN), a Mobile Equipment Identifier (MEID), an International Mobile Equipment Identity (IMEI) number, a mobile identification number (MIN), or a destination ID (DID), among other possibilities. An additional one or more data fields may also be included in the follow request 410 that identify the source following UE1 402 by a same or different type of identifier.

In at least one embodiment, not shown in FIG. 4, the follow request message 410 may be generated at some other communications network 10 party other than the following UE1 402, and similarly transferred to GC server 408. For example, a dispatch operator in network 24 or external networks 34 may generate the follow request message 410 identifying UE1 402 and UE2 404 as the following and followed UE's, respectively, and transmit the follow request message 410 to the GC server 408 on behalf of the UE1 402. Other possibilities exist as well.

Furthermore, while only one follow request 410 is illustrated in FIG. 4, any number of additional follow requests may be received at the GC server 408 from one or more UE's identified by UEx 406 in FIG. 4. The additional follow requests may identify the same followed UE2 404, or some other followed UE. It should be noted that any of the forthcoming descriptions and examples made with respect to following UE1 402 can equally be applied to additional following UE's in UEx 406.

In at least some embodiments, the follow request 410 may identify multiple followed UE's (for example, UE2 404 and a UE within the group represented by UEx 406). Included within the multiple UE follow request 410 may be a relative priority listing regarding which followed UE's group call to prioritize over the other when both are affiliated with currently active group calls. Furthermore, the follow request 410 may identify three or more followed UE's. It should be similarly noted that any of the forthcoming descriptions and examples made with respect to followed UE2 404 can equally be applied to additional followed UE's in UEx 406, with the caveat that the GC server 408 may have to perform some form of priority arbitration if multiple followed UEs are engaged in active group calls.

Returning now to the specific example in FIG. 4, upon receipt of the follow request 410, the GC server 408 processes the request at step 411. At step 411, the GC server 408 may determine whether the following UE1 402 is authorized to follow the followed UE2 404. This process may include the GC server 408 accessing a database, such as database 28, of pre-stored authorization information to determine if it should further process or discard the request 410. The database 28 may contain, for example, a whitelist of following UEs that are allowed to follow UE2 404 such that only those UEs in the whitelist are allowed to follow UE2. Alternatively, the database may contain a blacklist of following UEs that are explicitly denied the ability to follow UE2 404 such that only those UEs not listed in the blacklist are allowed to follow UE2. Other types of authorization mechanisms could be implemented as well.

Subsequently, GC server 408 optionally transmits a follow notification message 412 to UE2 404 notifying UE2 404 of the follow request 410 received from UE1 402. In the event that GC server 408 separately authorized the UE1 402 at step 411, the follow notification message 412 may simply be a notification, perhaps for display or logging by UE2 404, that UE1 402 has requested and received authorization to follow UE2 404. In other embodiments, the follow notification message 412 may include a first or additional authorization request for review and further action by a user of the UE2 404. After receipt of the follow notification 412, UE2 404 may display a corresponding notification, or in one embodiment, prompt a user of UE2 404 to (initially or further) authorize UE1 402's request to follow it. Accordingly, UE2 404 may optionally transmit a follow authorization response message 414 initially authorizing or confirming authorization for UE1 402 to follow UE2 404. At step 415, GC server 408 may, in accordance with the content of the optional follow authorization response message 414, either authorize or deny UE1's 402 request to follow UE2 404. If GC server 408 determines that UE1 402 is authorized to follow UE2 404, it may store a mapping in database 28 mapping UE2 404 and UE1 402, such that any modifications to UE2's 404 affiliated groups are duplicated to UE1's 402 group membership. In an embodiment in which the GC server 408 is configured to authorized or deny UE1's 402 follow request 410 without UE2's 404 involvement, the follow notification message 412 may also be transmitted at or after the follow response 416.

Next, GC server 408 may transmit a follow response message 416 indicating whether UE1's 402 follow request 410 was accepted and/or authorized. At step 417, UE1 402 processes the follow response message 416. Assuming authorization was granted, a message may displayed on a display of UE1 402 indicating that UE2 404 is now being followed. In at least one embodiment, the follow response message 416 may include an indication of which groups UE2 404 is currently affiliated with, and in step 417, UE1 402 may provide an indication that UE2 404 is now being followed and an indication of what corresponding groups UE2 is presently affiliated to via the display. In the event that authorization to follow UE2 404 is denied, at step 417 the UE1 402 may be given the opportunity to request a different UE to follow, to enter additional security provisions (e.g., passwords, keys, security codes, etc.) perhaps not previously provided in the follow request 410, or to try and send the follow request 410 again, among other options.

In the event that the method 400 is being executed in a narrow-band trunked RF communications architecture, the follow response 416 may also include an indication of one or more groups (or channels) that UE2 404 is affiliated with and may take the form of a dynamic regroup message. If more than one group is provided in the follow response message 416, the follow response message 416 may also indicate a relative priority of those groups as set and/or applied by UE2 404, so that UE1 402 may duplicate the relative priorities at the radio (e.g., by affiliating itself with the one or more groups indicated in the notification and tuning to particular channels in accordance with the relative priorities). In one narrowband architecture example, a multiplexed TDMA carrying multiple channels that can be monitored by a single UE, such as UE1 402, could provide an opportunity to apply the presently disclosed principles. In another narrowband architecture example, UE1 402 may include multiple transceivers such that UE1 402 can scan for transmissions on other channels while currently monitoring another traffic channel or a rest channel. Other possibilities exist as well. In a broadband communications architecture, such priority arbitration and channel switching is normally handled at the server (such as at the GC server 408).

Next, UE2 404 transmits a talk group affiliation request 418 requesting that it be affiliated with a new talk group TG1. At step 419, GC server 408 processes the TG1 affiliation request 418. During step 419, GC server 408 may make the requested changes to add UE 2 404 to TG1, but also accesses database 28 to determine if, and which, other UE's are following UE2 404. In this case, since UE1 402 was previously mapped to UE2 404 in database 28, GC server 408 automatically makes identical changes to cause UE1 402 to also be associated with the talk group TG1 indicated in the TG1 affiliation request 418, and may take the additional step of notifying UE1 402 of the change (not illustrated in FIG. 1). Making identical changes may include the GC server 408 adding UE1 402 to a distribution list for any future media streams and/or group information received that are transmitted to a talk group ID associated with TG1. Other group information may include, but is not limited to, participant identifications, current talker ID, emergency status information, group member presence information, incident status information, and current floor request queues.

In the event that the method 400 is being executed in a narrow-band communications architecture, step 419 may additionally or alternatively include the step of transmitting a dynamic regroup request to UE1 402 to indicate UE2's 404 new or additional group membership as indicated in the TG1 affiliation request 418. In at least some embodiments, Step 419 may also be executed in a broad-band communications architecture in which UE1 402 is configured to receive the group affiliation information in step 419 and mirror the group affiliations of UE2 404 with or without GC Server's 408 aid.

A similar process would be executed in the event the TG1 affiliation request 418 were instead a disaffiliation request. In other words, in the event UE2 404 decides to disaffiliate with a previously affiliated group, a disaffiliation message would be transmitted to GC server by UE2 404, processed by GC server 408 at step 419 to disaffiliate both UE2 404 and UE1 402 with the indicated group, and in some embodiments, a dynamic regroup request transmitted to UE1 402 providing the indicated group with which UE2 404 is no longer affiliated.

In any event, and returning to the example in FIG. 4 in which message 418 is an affiliation request, at some future point in time, a member UEx 406 of talk group TG1 that UE2 404 is affiliated with transmits a TG1 mediastream 420 with a destination address group ID associated with TG1. Accordingly, GC server 408, at step 421, will process the TG1 media stream, determine a distribution list of affiliated UEs to TG1, and forward and/or repeat the TG1 media stream to members of talk group TG1, including UE2 404 and UE1 402, via the repeated TG1 media stream 422. Of course, in the event that GC server 408 is not configured to be directly involved in media stream routing, some other device may, in cooperation with GC server 408, do the actual forwarding and repeating of the TG1 media stream using distribution list information stored and maintained at GC server 408.

In this manner, UE1 402 can duplicate a group talk experience of another UE (UE2 404), including changes to group membership made by the UE2 404 and even through the UE2 404's changing group scan list.

Although not shown in FIG. 4, but in order to prevent perpetual mapping of UE1 402 to UE2 404, UE1 402 may be configured to provide a periodic heartbeat signal to the GC server 408 to indicate its continued connection to network 24 and continued interest in following UE2 404. GC server 408 may be configured to remove the mapping between following UE1 402 and followed UE2 404 if no heartbeat is received from UE1 402 within a predetermined threshold amount of time. For example, the threshold may be 1 hour, 1 day, or 1 week. Additionally or alternatively, GC server 408 may be configured to poll UE1 402 at a predetermined interval in order to determine if UE1 402 is still connected to network 24 and/or still interested in following UE2 404. If no response to one or more poll messages is received within the predetermined interval, GC server 408 may then similarly remove the mapping between following UE1 402 and followed UE2 404.

FIG. 5 is a second ladder diagram in accordance with some embodiments setting forth an additional method 500 in which a following UE 402 (UE1) requests to follow a followed UE 404 (UE2). The devices UE 402, UE 404, UEx 406, and GC server 408 are substantially the same as set forth in FIG. 4, and retain their same character reference identifiers. Furthermore, steps 410-417 of method 500 are substantially identical to steps 410-417 of method 400, and are not repeated with respect to method 500.

In contrast to method 400, in which a group TG1 affiliation request 418 is transmitted to GC server 408 describing a single new group association, the first new transmission in method 500 is a scan request A message 518 transmitted by UE2 404 to GC server 408 setting forth a plurality of talk groups TG3-TG5 that UE2 404 wishes to scan (and tune to when communications are detected). The scan request A message 518 may also include a relative priority of the plurality of talk groups TG3-TG5 included in the message, so that GC server 408 (or UE1 402) may arbitrate among the talk groups TG3-TG5 in accordance with the indicated relative priorities and so that UE1 402 is provided with substantially the same media streams as UE2 404 as a result.

At step 519, GC server 408 processes the scan request A message 518. During step 519, GC server 408 may make the requested changes to add UE 2 404 to talk groups TG3-TG5 (and including storing an indication of their relative priority order), but also accesses database 28 to determine if, and which, other UEs are following UE2 404. In this case, since UE1 402 was previously mapped to UE2 404 in database 28, GC server 408 automatically makes identical changes to cause UE1 402 to also be associated with the talk groups TG3-TG5 indicated in the scan request A message 518, and may include storing an indication of the relative priority order to duplicate the priority order set by UE2 404. This may include adding UE1 402 to a distribution list for any future media streams and/or group information received that are transmitted to a talk group ID associated with any one of TG3-TG5. As set forth earlier, other group information may include, but is not limited to, participant identifications, current talker ID, emergency status information, group member presence information, incident status information, and current floor request queues for each of the talk groups in the scan request.

In the event that the method 500 is being executed in a narrow-band trunked communications architecture, step 519 may additionally or alternatively include the step of transmitting a dynamic regroup request to UE1 402 to indicate UE2's 404 new or additional group membership and relative priorities of talk groups TG3-TG5. In at least some embodiments, Step 519 may also be executed in a broad-band communications architecture in which UE1 402 is configured to receive the group affiliation information in step 519 and mirror the scan group affiliations of UE2 404 with or without GC Server's 408 aid.

At some point in time, a member UEx 406 of talk group TG3 that UE2 404 is affiliated with transmits a TG3 mediastream 520 with a destination address group ID associated with TG3. Accordingly, GC server 408, at step 521, will process the TG3 media stream, determine a distribution list of affiliated UEs to TG3, and forward and/or repeat the TG3 media stream to members of talk group TG3, including UE2 404 and UE1 402, via the repeated TG3 media stream 522 (assuming, of course, that those members do not have any other active, higher priority media streams at the time). In the event that GC server 408 is not configured to be directly involved in media stream routing, some other device may, in cooperation with GC server 408, do the actual forwarding and repeating of the TG3 media stream using distribution list information stored and maintained at GC server 408.

As set forth in FIG. 5, at some point in time while the TG3 media stream 522 is being distributed to its group members, including UE1 402 and UE2 404, a second TG4 mediastream 524 may be received at GC server 408 and processed at step 525. For the purposes of this example, it is assumed that UE2 404 has assigned a priority of talk group TG4 higher than a priority of talk group TG3. Because TG4 is set as a higher priority, UE1 402, UE2 404, and UEx 406 members of the talk group TG4 will begin receiving the repeated TG4 mediastream 526 in place of the TG3 media stream 522 (or be instructed to find the TG4 mediastream on another identified channel). In the event the method 500 is being executed in a broadband architecture, GC server 408 (or some other network entity in cooperation with GC server 408) may simply replace the repeated TG3 mediastream 522 previously provided to UE1 402 and/or UE2 404 with the repeated TG4 mediastream 526 on a same channel, or may provide the repeated TG4 mediastream 526 on a different channel and instruct UE1 402 and UE2 404 to locate the higher priority repeated TG4 mediastream 526 on the different channel. In the event the method 500 is being executed in a narrowband architecture, the individual radios UE1 402 and UE2 404, with or without receiving an instruction to do so from GC server 408, may be configured to switch to the different channel to receive the repeated TG4 mediastream 526. In one narrowband architecture example, the repeated TG3 and TG4 mediastreams may be provided to UE1 402 and UE2 404 on two channels of a multiplexed TDMA channel, and an indication of the availability of the higher priority repeated TG4 mediastream 526 provided to UE1 402 and UE2 404 on a control channel of the multiplexed TDMA channel. In another narrowband architecture example, UE1 402 and UE2 404 may include multiple transceivers such that, while UE1 402 and UE2 404 are tuned to a channel associated with the repeated TG3 mediastream 522, a second transceiver can scan other channels in a priority list for the higher priority repeated TG4 mediastream 526, and when located, switch from receiving on the repeated TG3 mediastream channel 522 to receiving on the repeated TG4 mediastream channel 526. Other possibilities exist as well.

At some point in time, UE2 404 may transmit a scan request B message 528 changing the talk groups it is affiliated with and/or changing the relative priorities of the talk groups it has previously affiliated with. Similar to step 525, GC server 408 processes the scan request B at step 530, including, in a narrowband trunked radio architecture, transmitting a dynamic regroup message to UE1 402.

In this manner, a UE1 402 can duplicate a group talk experience of UE2 404, including changes to group membership and/or changes to relative group priority information made by the UE2 404 second UE device and even through the UE2 404's changing group scan list.

Although not shown in FIG. 5, but similar to FIG. 4 above and in order to prevent perpetual mapping of UE1 402 to UE2 404, UE1 402 may be configured to provide a periodic heartbeat signal to the GC server 408 to indicate its continued connection to network 24 and continued interest in following UE2 404. GC server 408 may be configured to remove the mapping between following UE1 402 and followed UE2 404 if no heartbeat is received from UE1 402 within a predetermined threshold amount of time. For example, the threshold may be 1 hour, 1 day, or 1 week. Alternatively, GC server 408 may be configured to poll UE1 402 at a predetermined interval in order to determine if UE1 402 is still connected to network 24 and/or still interested in following UE2 404. If no response to one or more poll messages is received, GC server 408 may then similarly remove the mapping between following UE1 402 and followed UE2 404.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of the present teachings.

Furthermore, and although not shown in FIG. 4 or FIG. 5, at any time the following UE1 402 or the followed UE2 404 may transmit a termination request to the GC server 408 severing the mapping between the UE1 402 and UE2 404. In response to the termination request, the GC server 408 may, in one embodiment, automatically disaffiliate the following UE1 402 from every group that the UE2 404 is currently affiliated with. In another embodiment, the GC server 408 may revert UE1's 402 group membership to a state prior to a time in which the follow request 410 was received. In order to enable such a reversion, GC server 408 may be configured to store a copy of UE1's 402 group membership in response to receiving the follow request 410, so that when a termination request is received from either one of UE1 402 or UE2 404, UE1's 402 group membership can be returned to its original state prior to receive of the follow request 410 by the GC server 408. In still one other embodiment, the GC server 408 may simply refrain from further mirroring any group membership affiliation changes made by UE2 404 to UE1's 402 group membership affiliations, leaving UE1 402 with its current affiliations at the time the mapping between UE1 402 and UE2 404 is severed. Other possibilities exist as well.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for enabling a group communications follow mode at a first group communications (GC) user equipment (UE) device, the method comprising:
   receiving, at a GC server, a request requesting initiation of a follow mode in which a first client UE device follows a second client UE device;
   responsive to receiving the request, the GC server affiliating the first client UE device with a first set of one or more talk groups with which the second client UE device is currently affiliated and, while the GC server has not yet received a termination request to terminate the follow mode, the GC server:
      monitoring for talk group disaffiliation requests from the second client UE device and, responsive to receiving a first disaffiliation request from the second client UE device requesting disaffiliation of the second client UE device from a first particular talk group, automatically disaffiliating both the first client UE device and the second client UE device from the first particular talk group; and
      monitoring for additional talk group affiliation requests, beyond the first set of one or more talk groups, from the second client UE device and responsive to receiving a first affiliation request from the second client UE device requesting affiliation of the second client UE device with a second particular talk group, automatically affiliating both the first client UE device and the second client UE device with the second particular talk group.

2. The method of claim 1, wherein each talk group is a group of associated UE devices such that media streams transmitted by one member of the talk group is automatically distributed to all other members of the talk group, the method further comprising, after affiliating both the first client UE device and the second client UE device with the second particular talk group, receiving one or more media streams associated with the second particular talk group, and providing the one or more media streams to both the first and second client UE devices.

3. The method of claim 1, wherein the affiliating further comprises affiliating the first client UE device with a same two or more talk groups with which the second client UE device is currently affiliated, and furthermore, duplicating relative priorities assigned to the two or more talk groups by the second client UE device to the first client UE device's affiliations with the same two or more talk groups.

4. The method of claim 1, further comprising the step of, after receiving the request and before affiliating the first client UE device with the same one or more talk groups with which the second client UE device is currently affiliated:
   accessing an authorization database and determining that the first client UE device is authorized to follow the second client UE device.

5. The method of claim 1, further comprising the step of, after receiving the request and before affiliating the first client UE device with the same one or more talk groups with which the second client UE device is currently affiliated:
   transmitting an authorization request to the second client UE device requesting authorization to allow the first client UE device to follow the second client UE device; and
   subsequently receiving authorization from the second client UE device authorizing the first client UE device to follow the second client UE device.

6. The method of claim 5, wherein the authorization request includes an identifier identifying one of the first client UE device and a user of the first client UE device.

7. The method of claim 1, further comprising providing a notification to the second UE device, including an identifier identifying one of the first client UE device and a user of the first client UE device, of the first UE device's following of the second UE device.

8. The method of claim 1, further comprising receiving, at the GC service device, a second request from the first client UE device requesting initiation of a second follow mode in which the first client UE device follows a third client UE device and a priority listing setting forth a relative priority between the second client UE device and the third client UE device, and responsive to receiving the second request, affiliating the first client UE device with a second set of one or more talk groups with which the third client UE is currently affiliated and, while the GC server has not yet received a termination request to terminate the second follow mode, the GC server:
   monitoring for talk group disaffiliation requests from the third client UE device and, responsive to receiving a second disaffiliation request from the third client UE requesting disaffiliation of the third client UE device from a third particular talk group, disaffiliating both the first client UE device and the third client UE device from the third particular talk group; and
   monitoring for additional talk group affiliation requests, beyond the second set of one or more talk groups, from the third client UE device and, responsive to receiving a second affiliation request from the third client UE device requesting affiliation of the third client UE device with a fourth particular talk group, affiliating both the first client UE device and the third client UE device with the fourth particular talk group.

9. The method of claim 8, further comprising the step of, responsive to detecting one or more media streams on one or more talk groups associated with the second client UE device and one or more talk groups associated with the third client UE device, referencing the priority listing to determine which of the one or more media streams should be forwarded to the first client UE device.

10. The method of claim 1, wherein the GC server is configured to operate in one of (i) a cellular or voice over IP (VoIP) architecture, and the request is received in one of a SIP SUBSCRIBE and SIP PUBLISH message and (ii) a narrowband trunked radio architecture and the request is received in one of a control signaling block (CSBK) message and a packet data protocol (PDP) message.

11. The method of claim 1, wherein disaffiliating and affiliating the first client UE device with the first particular talk group and the second particular talk group, respectively, comprise transmitting a dynamic regrouping message to the first client UE device.

12. The method of claim 1, further comprising receiving the termination request from one of the first client UE device and the second client UE device requesting termination of the follow mode, and responsively either (i) disaffiliating the first client UE device with one or more groups with which the second client UE device is currently affiliated with or (ii) leaving the first client UE device's group affiliations as they are but refraining from propagating any future second client UE device group affiliation changes to the first client UE device's group affiliations.

13. The method of claim 1, wherein the request requesting initiation of the follow mode is received at the GC server from the first client UE.

14. The method of claim 1, wherein the request requesting initiation of the follow mode is received at the GC server from a device separate from the first client UE and the GC server.

15. The method of claim 1, wherein each talk group is a group of associated UE devices such that a media stream transmitted by one member of the talk group is automatically distributed to all other members of the talk group.

16. A system supporting a group communications follow mode at a first group communications (GC) user equipment (UE) device, the system comprising:
a first client UE device configured to transmit a request to a GC server requesting initiation of a follow mode in which in which the first client UE follows a second client UE device;
the second client UE device configured to transmit a request to the GC server requesting affiliation with a first set of one or more talk groups; and
the GC server configured to, responsive to receiving the request from the first client UE device affiliate the first client UE device with the first set of one or more talk groups with which the second client UE device is currently affiliated and, while the GC server has not yet received a termination request to terminate the follow mode, the GC server further configured to:
monitor for talk group disaffiliation requests from the second client UE device and, responsive to receiving a first disaffiliation request from the second client UE device requesting disaffiliation of the second client UE device from a first particular talk group, automatically disaffiliate both the first client UE device and the second client UE device from the first particular talk group; and
monitor for additional talk group affiliation requests, beyond the first set of one or more talk groups, from the second client UE device and responsive to receiving a first affiliation request from the second client UE device requesting affiliation of the second client UE device with a second particular talk group, automatically affiliate both the first client UE device and the second client UE device with the second particular talk group.

17. The system of claim 16, wherein each talk is a group of associated UE devices such that media streams transmitted by one member of the talk group is automatically distributed to all other members of the talk group, and wherein the GC server is further configured to, after affiliating both the first client UE device and the second client UE device with the second particular talk group, receive one or more media streams associated with the second particular talk group, and to provide the one or more media streams to both the first and second client UE devices.

18. The system of claim 16, wherein the GC server is further configured to affiliate the first client UE device with a same two or more talk groups with which the second client UE device is currently affiliated, and furthermore, to duplicate relative priorities assigned to the two or more talk groups by the second client UE device to the first client UE device's affiliations with the same two or more talk groups.

19. The system of claim 16, wherein the GC server is further configured to, after receiving the request and before affiliating the first client UE device with the same one or more talk groups with which the second client UE device is currently affiliated:
access an authorization database and determine that the first client UE device is authorized to follow the second client UE device.

20. The system of claim 16, wherein the GC server is further configured to, after receiving the request and before affiliating the first client UE device with the same one or more talk groups with which the second client UE device is currently affiliated:
transmit an authorization request to the second client UE device requesting authorization to allow the first client UE device to follow the second client UE device; and
subsequently receive authorization from the second client UE device authorizing the first client UE device to follow the second client UE device.

21. The system of claim 20, wherein the authorization request includes an identifier identifying one of the first client UE device and a user of the first client UE device.

22. The system of claim 16, wherein the GC server is further configured to provide a notification to the second UE device, including an identifier identifying one of the first client UE device and a user of the first client UE device, of the first UE device's following of the second UE device.

23. The system of claim 16, wherein the GC server is further configured to, responsive to receiving the termination request from one of the first client UE device and the second client UE device requesting termination of the follow mode, disaffiliate the first client UE device with one or more groups with which the second client UE device is currently affiliated with.

24. The system of claim 16, wherein each talk group is a group of associated UE devices such that a media stream transmitted by one member of the talk group is automatically distributed to all other members of the talk group.

* * * * *

UNITED STATES PATENT AND TRADEMARK OFFICE
CERTIFICATE OF CORRECTION

PATENT NO. : 8,781,515 B2  
APPLICATION NO. : 13/223561  
DATED : July 15, 2014  
INVENTOR(S) : Anatoly Agulnik et al.

Page 1 of 1

It is certified that error appears in the above-identified patent and that said Letters Patent is hereby corrected as shown below:

IN THE TITLE PAGE:

Under "ABSTRACT," Item (57), in Column 2, Line 4, delete "second Client" and insert -- second client --, therefor.

IN THE SPECIFICATION:

In Column 3, Line 44, delete "wireless links 20, 22." and insert -- wireless links 21, 23. --, therefor.

In Column 6, Line 64, delete "PT server 26" and insert -- GC server 26 --, therefor.

IN THE CLAIMS:

In Column 16, Line 48, in Claim 10, delete "architecture," and insert -- architecture --, therefor.

In Column 17, Lines 15-16, in Claim 16, delete "in which in which" and insert -- in which --, therefor.

Signed and Sealed this  
Third Day of May, 2016

Michelle K. Lee  
*Director of the United States Patent and Trademark Office*